US012612128B2

(12) United States Patent
Takeuchi

(10) Patent No.: US 12,612,128 B2
(45) Date of Patent: Apr. 28, 2026

(54) STRADDLE-TYPE VEHICLE

(71) Applicant: KAWASAKI MOTORS, LTD., Akashi (JP)

(72) Inventor: Hiroshi Takeuchi, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 420 days.

(21) Appl. No.: 18/198,399

(22) Filed: May 17, 2023

(65) Prior Publication Data

US 2023/0373583 A1      Nov. 23, 2023

(30) Foreign Application Priority Data

May 18, 2022    (JP) ................................. 2022-081273

(51) Int. Cl.
B62J 43/16          (2020.01)
B62K 11/04          (2006.01)
B62K 25/08          (2006.01)

(52) U.S. Cl.
CPC .............. B62J 43/16 (2020.02); B62K 11/04 (2013.01); B62K 25/08 (2013.01); *B62K 2204/00* (2013.01)

(58) Field of Classification Search
CPC . B62J 43/16; B62J 43/28; B62J 43/20; B62K 11/04; B62K 25/08; B62K 2204/00; B62K 11/00; B62M 7/04
See application file for complete search history.

(56) References Cited

U.S. PATENT DOCUMENTS

| | | | | |
|---|---|---|---|---|
| 9,238,495 | B2 * | 1/2016 | Matsuda | .............. B60L 3/0046 |
| 9,327,586 | B2 * | 5/2016 | Miyashiro | ................ B62J 43/20 |
| 9,346,421 | B2 * | 5/2016 | Miyashiro | ........... H01M 50/271 |
| 9,545,968 | B2 * | 1/2017 | Miyashiro | ................ B62J 43/28 |
| 9,884,566 | B2 | 2/2018 | Mochizuki et al. | |
| 2004/0031632 | A1 * | 2/2004 | Kohda | .................... B60L 53/80 |
| | | | | 180/68.5 |
| 2013/0256049 | A1 | 10/2013 | Matsuda | |
| 2015/0075889 | A1 | 3/2015 | Eguchi | |
| 2015/0210339 | A1 * | 7/2015 | Igarashi | ................. B62K 25/04 |
| | | | | 180/220 |
| 2016/0280306 | A1 | 9/2016 | Miyashiro et al. | |
| 2016/0347199 | A1 | 12/2016 | Mochizuki et al. | |
| 2017/0113556 | A1 * | 4/2017 | Nakamura | ................ B62J 43/20 |

(Continued)

FOREIGN PATENT DOCUMENTS

| | | | | |
|---|---|---|---|---|
| CN | 104443213 A | | 3/2015 | |
| CN | 117985152 A | * | 5/2024 | ........... H01M 50/24 |

(Continued)

*Primary Examiner* — Drew J Brown
(74) *Attorney, Agent, or Firm* — PROCOPIO, CORY, HARGREAVES & SAVITCH LLP

(57)          ABSTRACT

There is provided a straddle-type vehicle including: a vehicle body frame; at least one wheel; a drive source configured to generate power to be transmitted to the wheel; and a battery case including an accommodation space in which a battery for storing electric power is accommodated and an opening that opens the accommodation space upward for inserting and removing the battery. The battery case is inclined with respect to a vertical direction such that the opening faces obliquely upward and rearward. A lower end of the battery case is disposed in a front space of the drive source and located lower than an upper end of the drive source.

11 Claims, 9 Drawing Sheets

(56)     References Cited

U.S. PATENT DOCUMENTS

2019/0241231  A1 *    8/2019   Cheng .................... B62K 19/40
2022/0144367  A1      5/2022   Sato et al.
2022/0278410  A1      9/2022   Kashiwai et al.
2025/0019033  A1 *    1/2025   Hu ........................... B62M 7/04

FOREIGN PATENT DOCUMENTS

DE         102009000360  A1     12/2010
EP             2210803  A2      7/2010
EP             2623404  A1      8/2013
EP             2778031  A1 *    9/2014    ............. B60L 58/18
EP             3536592  A1      9/2019
EP             4530167  A1 *    4/2025    ............. B62J 43/28
JP         2004-161180  A       6/2004
JP         2019-155985  A       9/2019
JP          2024118004  A  *    8/2024    ............... B62J 9/14
JP          2024135146  A  *   10/2024    ............. B62J 43/23
JP          2024141876  A  *   10/2024    ............. B62J 43/16
WO         2012-066601  A1      5/2012
WO         2015-068753  A1     11/2014
WO      WO-2019064476  A1 *    4/2019    ............... B62J 9/12
WO         2021-005765  A1      1/2021
WO         2021-070897  A1      4/2021

* cited by examiner

LEFT ⟵    13    ⟶ RIGHT

STRADDLE-TYPE VEHICLE

CROSS-REFERENCE TO RELATED APPLICATIONS

This application is based on and claims priority under 35 USC 119 from Japanese Patent Application No. 2022-081273 filed on May 18, 2022, the contents of which are incorporated herein by reference.

TECHNICAL FIELD

The present disclosure relates to a straddle-type vehicle including a battery case that accommodates battery.

BACKGROUND ART

WO2015/068753A1 discloses an electric straddle-type vehicle in which a drive wheel is driven by a motor. A battery case is mounted on the straddle-type vehicle. The battery case accommodates a battery for supplying electric power to the motor.

Even in the straddle-type vehicle that supplies the electric power to the motor, improvement in a driving feeling is desired.

SUMMARY OF INVENTION

The present disclosure provides a straddle-type vehicle which can improve a driving feeling thereof.

According to an illustrative aspect of the present disclosure, a straddle-type vehicle includes: a vehicle body frame; at least one wheel; a drive source configured to generate power to be transmitted to the wheel; and a battery case including an accommodation space in which a battery for storing electric power is accommodated and an opening that opens the accommodation space upward for inserting and removing the battery. The battery case is inclined with respect to a vertical direction such that the opening faces obliquely upward and rearward. A lower end of the battery case is disposed in a front space of the drive source and located lower than an upper end of the drive source.

According to the present disclosure, since the lower end of the battery case is located lower than the upper end of the drive source, the battery which is a heavy object can be disposed low, and a center of gravity of the straddle-type vehicle can be lowered. Further, since the battery case is inclined rearward from the lower end to the upper side, the upper portion of the battery case is easily disposed closer to the drive source. Accordingly, in the straddle-type vehicle, by bringing the drive source which is the heavy object and the battery case close to each other, the heavy objects can be easily disposed close to a center of gravity of a vehicle body. In this way, it is possible to improve operability when changing an attitude of the straddle-type vehicle, and to improve a driving feeling.

DESCRIPTION OF EMBODIMENTS

Hereinafter, a straddle-type vehicle according to an embodiment will be described with reference to the accompanying drawings. In the present specification, a front-rear direction, a left-right direction (lateral direction), and an upper-lower direction refer to directions viewed from a rider when the rider sits on the straddle-type vehicle.

First Embodiment

Figure 1:
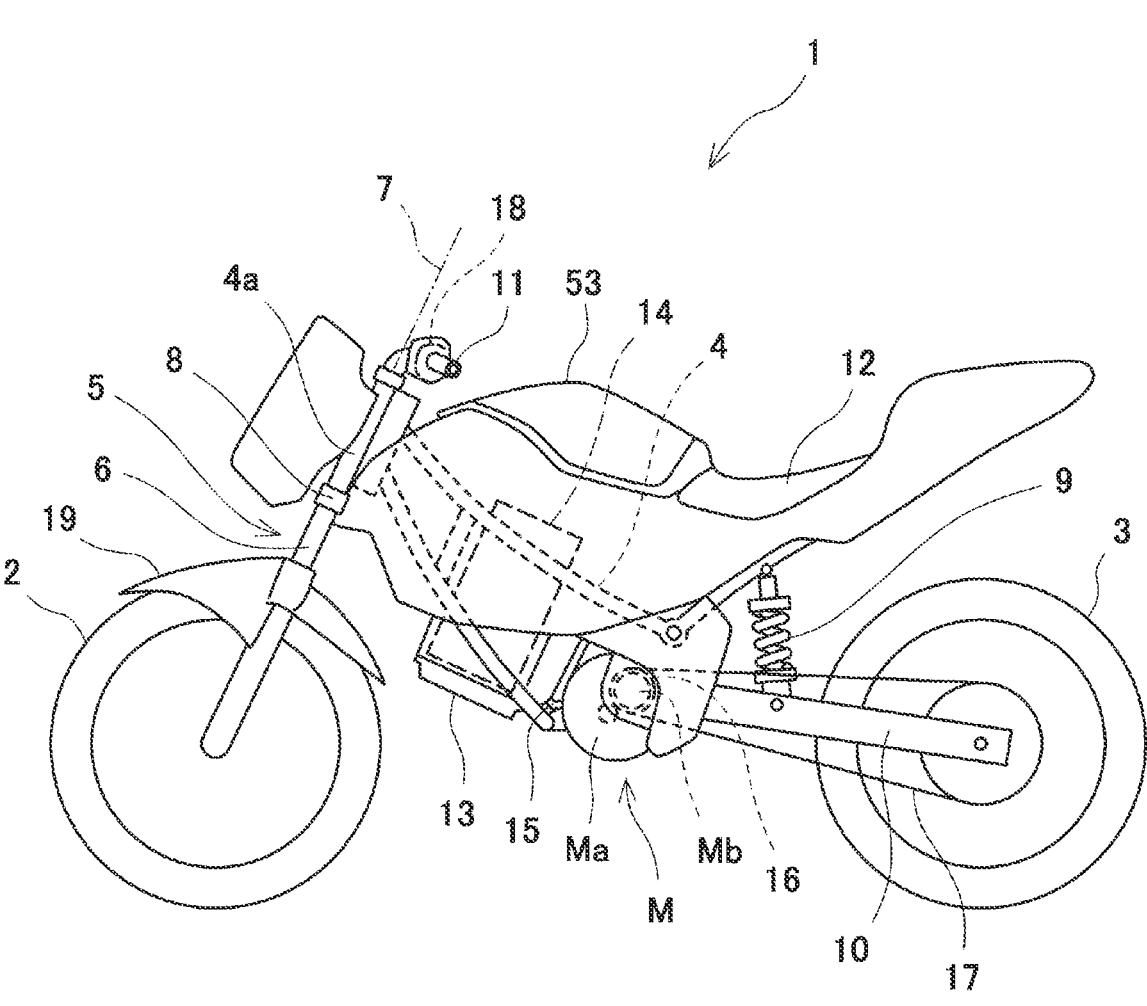
FIG. 1 is a side view of a straddle-type vehicle according to a first embodiment.

FIG. 1 is a side view of a straddle-type vehicle 1 (vehicle) according to a first embodiment. As shown in FIG. 1, in the present embodiment, the straddle-type vehicle 1 is an electric motorcycle.

The straddle-type vehicle 1 includes a front wheel 2, a rear wheel 3, and a vehicle body frame 4. The vehicle body frame 4 is supported by the front wheel 2 and the rear wheel 3. The straddle-type vehicle 1 includes front fork 5 connecting the front wheel 2 to the vehicle body frame 4 and provided between the front wheel 2 and the vehicle body frame 4. The front fork 5 is provided at a lower portion of a steering shaft 7, and is connected to a bracket 8 disposed at an interval in the upper-lower direction. The front fork 5 extends obliquely upward and rearward. The front fork 5 is provided with a front suspension 6, and the front fork 5 is configured to extend and contract in a longitudinal direction by elastic deformation of a spring inside the front suspension 6. The front fork 5 extends and contracts in the longitudinal direction to reduce an impact transmitted to the vehicle body frame 4. The steering shaft 7 connected to the bracket 8 is supported by a head pipe 4a, which is a part of the vehicle body frame 4, so as to be angularly displaceable. The straddle-type vehicle 1 further includes a rear suspension 9 connecting the rear wheel 3 to a rear portion of the vehicle body frame 4. A swing arm 10 that supports the rear wheel 3 and extends in the front-rear direction is supported on the vehicle body frame 4 so as to be angularly displaceable.

The steering shaft 7 is provided with a handle bar 11 which a rider grippes by their hands. An outer lid 53 that covers an insertion opening for battery, which will be described later, is provided behind the handle bar 11. A seat 12 on which the rider sits is provided behind the outer lid 53.

The straddle-type vehicle 1 includes a motor M as a drive source that generates power to be transmitted to the wheels. The motor M is mounted on the vehicle body frame 4 between the front wheel 2 and the rear wheel 3. In the present embodiment, the motor M functions as a prime mover that generates a rotational drive force to be transmitted to the rear wheel 3.

The straddle-type vehicle 1 includes battery 14 and a battery case 13 that accommodates the battery 14 therein. The battery 14 is configured to store electric power supplied to electrical components. In the present embodiment, the battery 14 supplies the electric power to the motor M. Accordingly, the motor M is driven, and the straddle-type vehicle 1 travels. The battery 14 is connected to the motor M via an electric wire 15. The battery case 13 is attached to the vehicle body frame 4.

The motor M includes a motor case Ma and a motor drive shaft Mb protruding from the motor case Ma. A sprocket 16 is provided on the motor drive shaft Mb so as to be rotated together with the motor drive shaft Mb. A gear or a pulley may be used as a rotary member instead of the sprocket 16. A chain 17 is connected to the sprocket 16 on a motor drive shaft Mb side. Accordingly, the drive force output from the motor drive shaft Mb is transmitted to the rear wheel 3 via the chain 17. The drive force output from the motor drive shaft Mb may not be transmitted to the rear wheel 3 by the chain, and may be transmitted by another power transmission member such as a belt.

An electronic control unit (ECU) controls driving of the drive motor M by adjusting the electric power supplied from the battery 14 to the motor M via a battery management unit (BMU) and an inverter. A throttle device 18 is operated by a rider and controls the driving of the motor M in accordance with an operation of the rider.

When the rider drives the straddle-type vehicle 1 and an impact acts on the vehicle body due to unevenness or the like of a traveling path during traveling, the front fork 5 extends and contracts in the longitudinal direction. Since the front suspension 6 reduces the impact transmitted to the vehicle body frame 4 by the extension and contraction, the impact transmitted to the rider can be reduced. Accordingly, riding comfort of the rider can be improved.

The straddle-type vehicle 1 further includes a linkage component connected to the front fork 5 and moving up and down together with the front fork 5 as the front fork 5 extends and contracts. In the present embodiment, a front fender 19 attached to the front fork 5 is provided as the linkage component so as to protrude in the front-rear direction from the front fork 5 and cover an upper side of the front wheel 2. Since the front fender 19 moves up and down together with the front fork 5, the front fender 19 does not move relative to the front wheel 2 even if the front fork 5 extends and contracts. Accordingly, the front fender 19 continues to cover an upper side of the front wheel 2 while maintaining a predetermined distance from the front wheel 2. Accordingly, even if foreign matters such as small stones and gravel are taken up by the rotation of the front wheel 2, the rider and the vehicle body are protected by the front fender 19.

Figure 2:
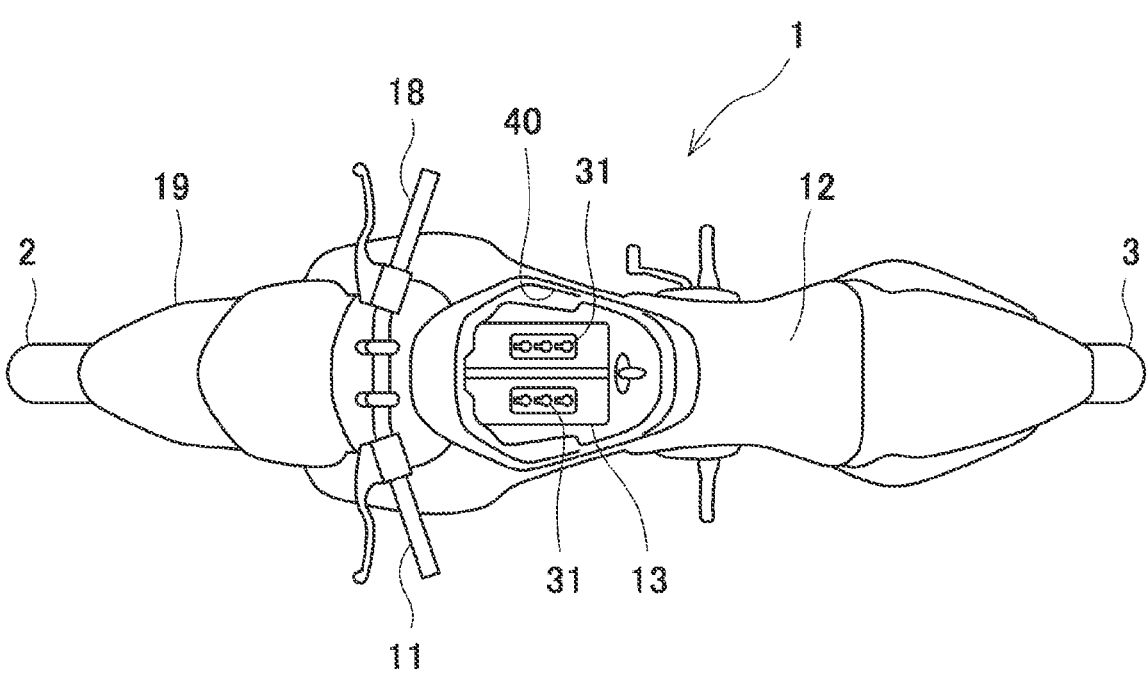
FIG. 2 is a plan view of the straddle-type vehicle of FIG. 1 in a state in which a cover is removed.

FIG. 2 is a plan view of the straddle-type vehicle 1. As shown in FIG. 2, the straddle-type vehicle 1 has an insertion opening 40 opened upward in order to mount the battery 14 on the battery case 13. The insertion opening 40 is provided above an opening of the battery case 13 at a position between the front fork 5 and the seat 12 in the front-rear direction in order for an operator to access the opening of the battery case 13 when inserting and removing the battery 14 into and from the battery case 13. FIG. 2 shows a state in which the outer lid 53 covering the insertion opening 40 of the straddle-type vehicle 1 is removed. Further, a state in which the battery 14 is not accommodated in an accommodation space of the battery case 13 is shown. Therefore, FIG. 2 shows case-side connector 31 in the battery case 13 to be described later. As shown in FIG. 2, the battery case 13 is configured such that the two batteries 14 are disposed side by side in a width direction inside the battery case 13 and accommodated inside the battery case 13.

Figure 3:
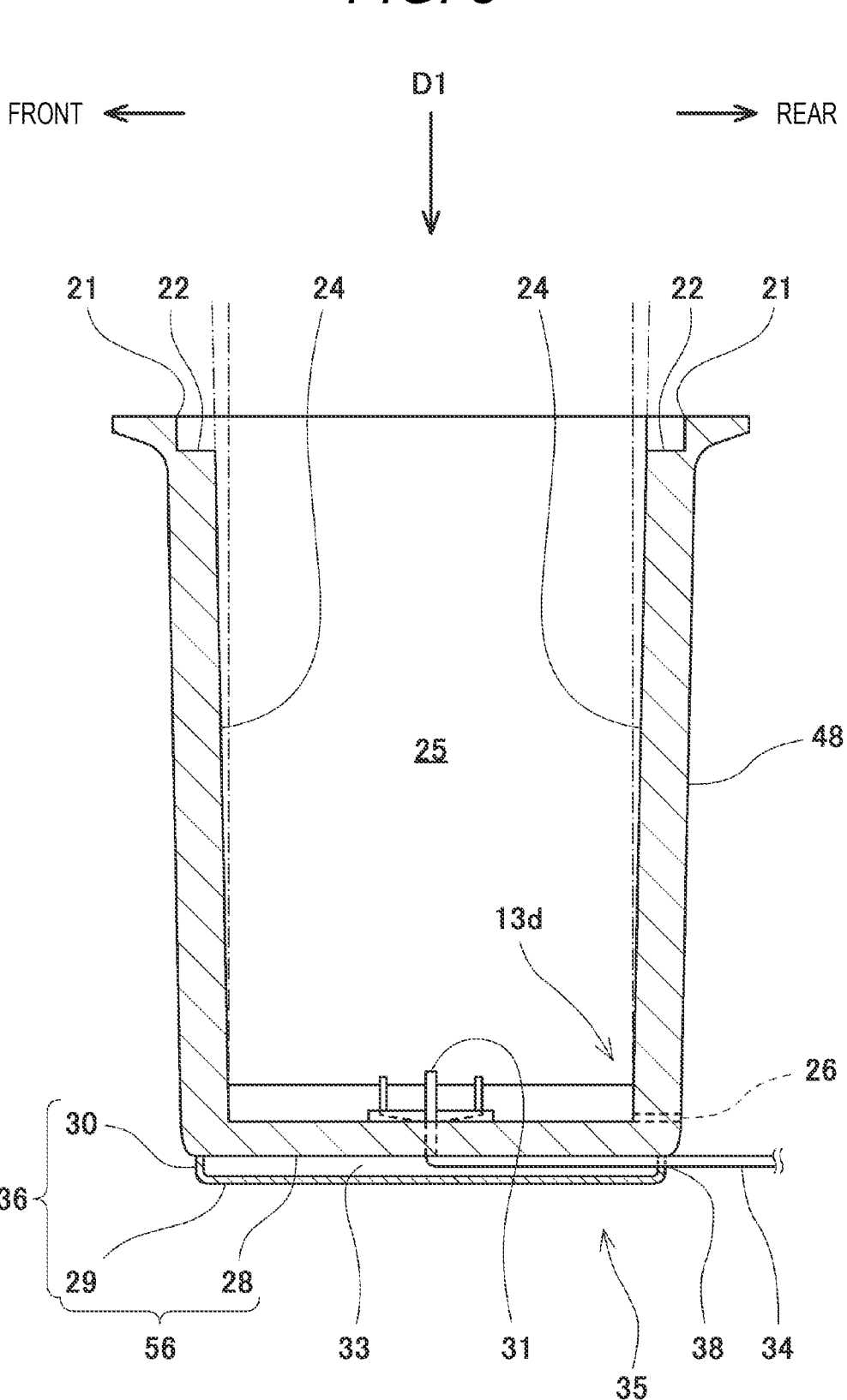
FIG. 3 is a cross-sectional view of a battery case of the straddle-type vehicle of FIG. 1, taken along a surface in a front-rear direction.
Figure 4:
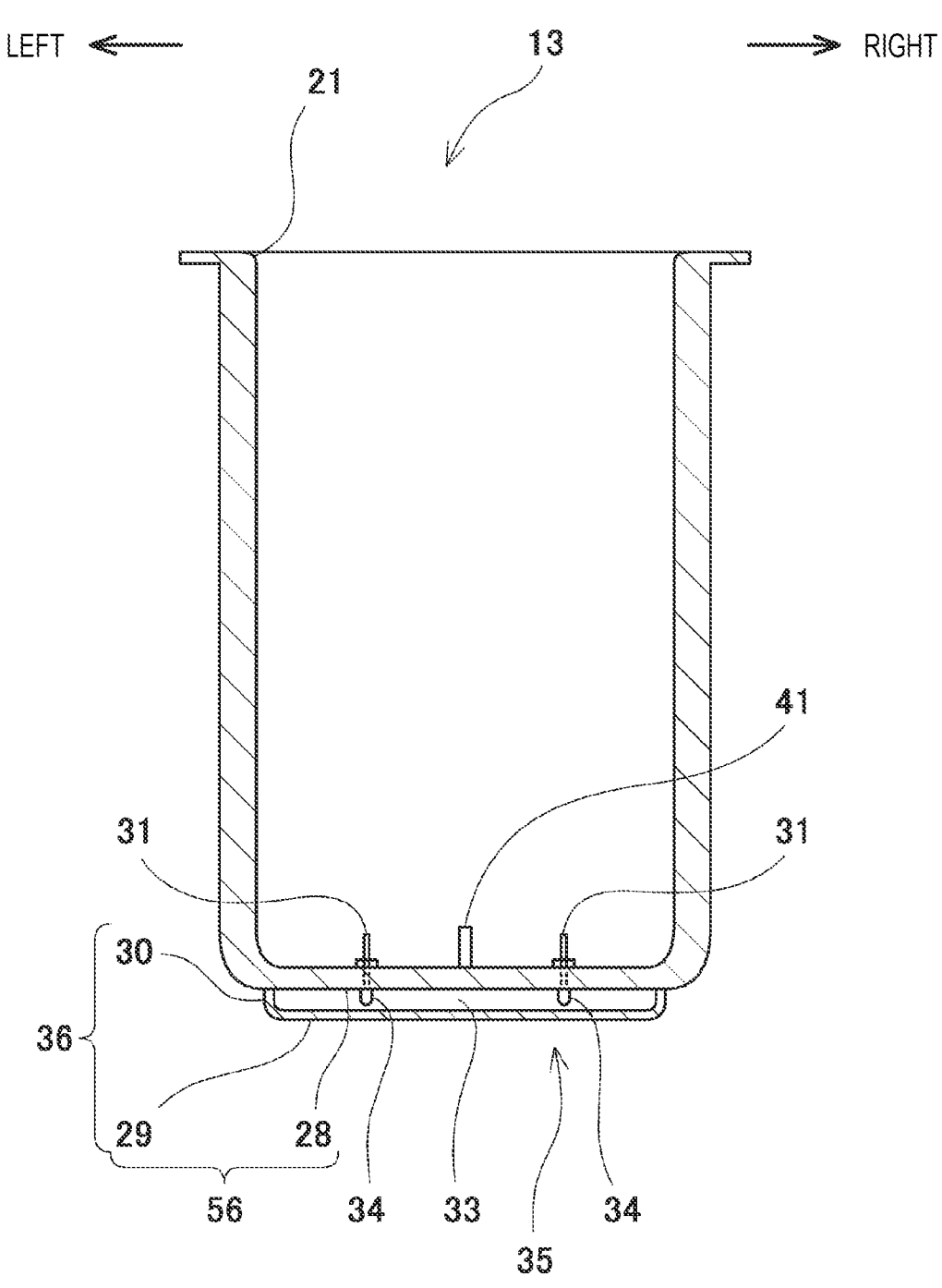
FIG. 4 is a cross-sectional view of the battery case of the straddle-type vehicle of FIG. 1, taken along a surface in a width direction.
Figure 5:
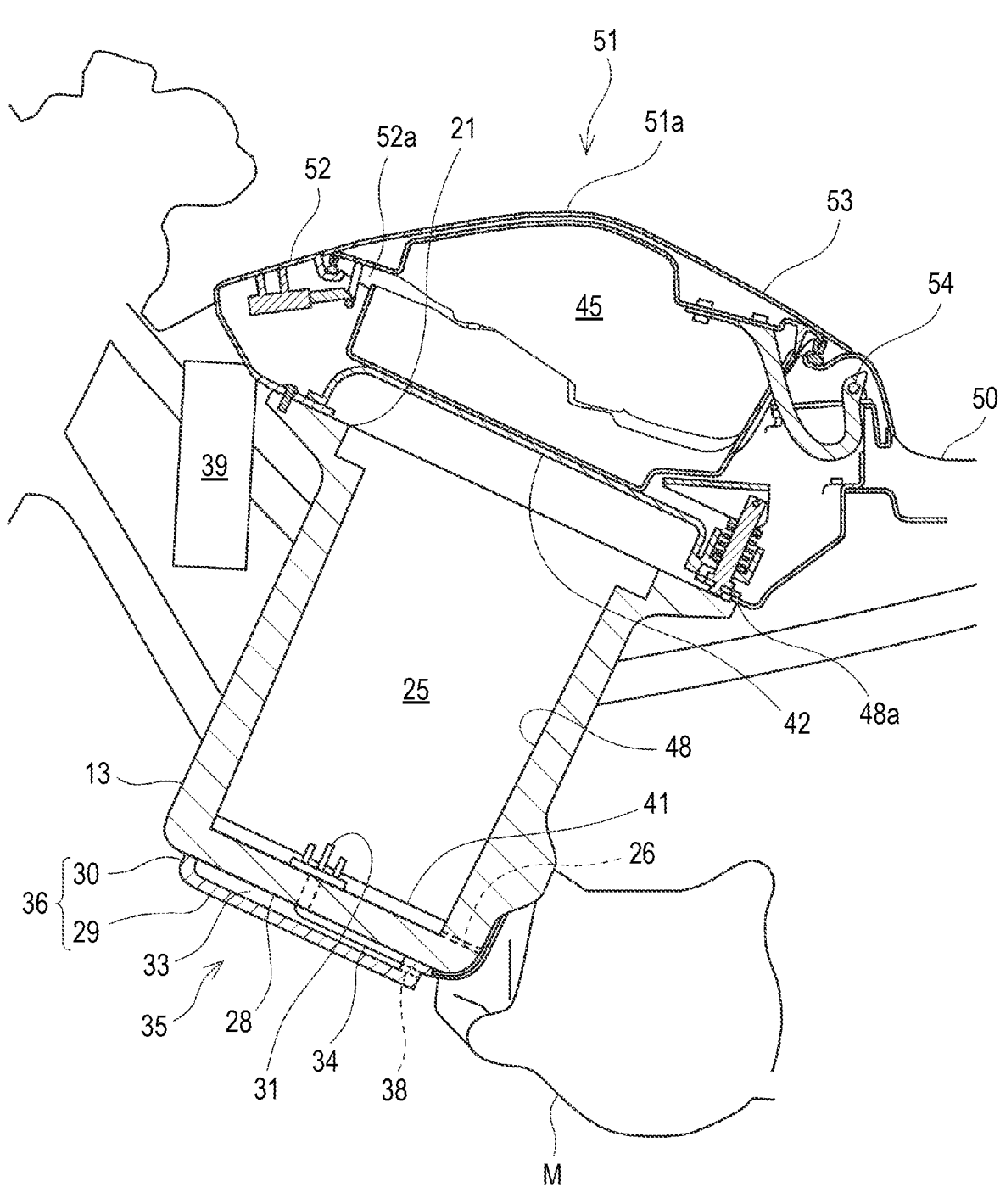
FIG. 5 is a cross-sectional view of a periphery of the battery case in the straddle-type vehicle of FIG. 1, taken along a surface in the front-rear direction in a state in which the cover is closed.
Figure 6:
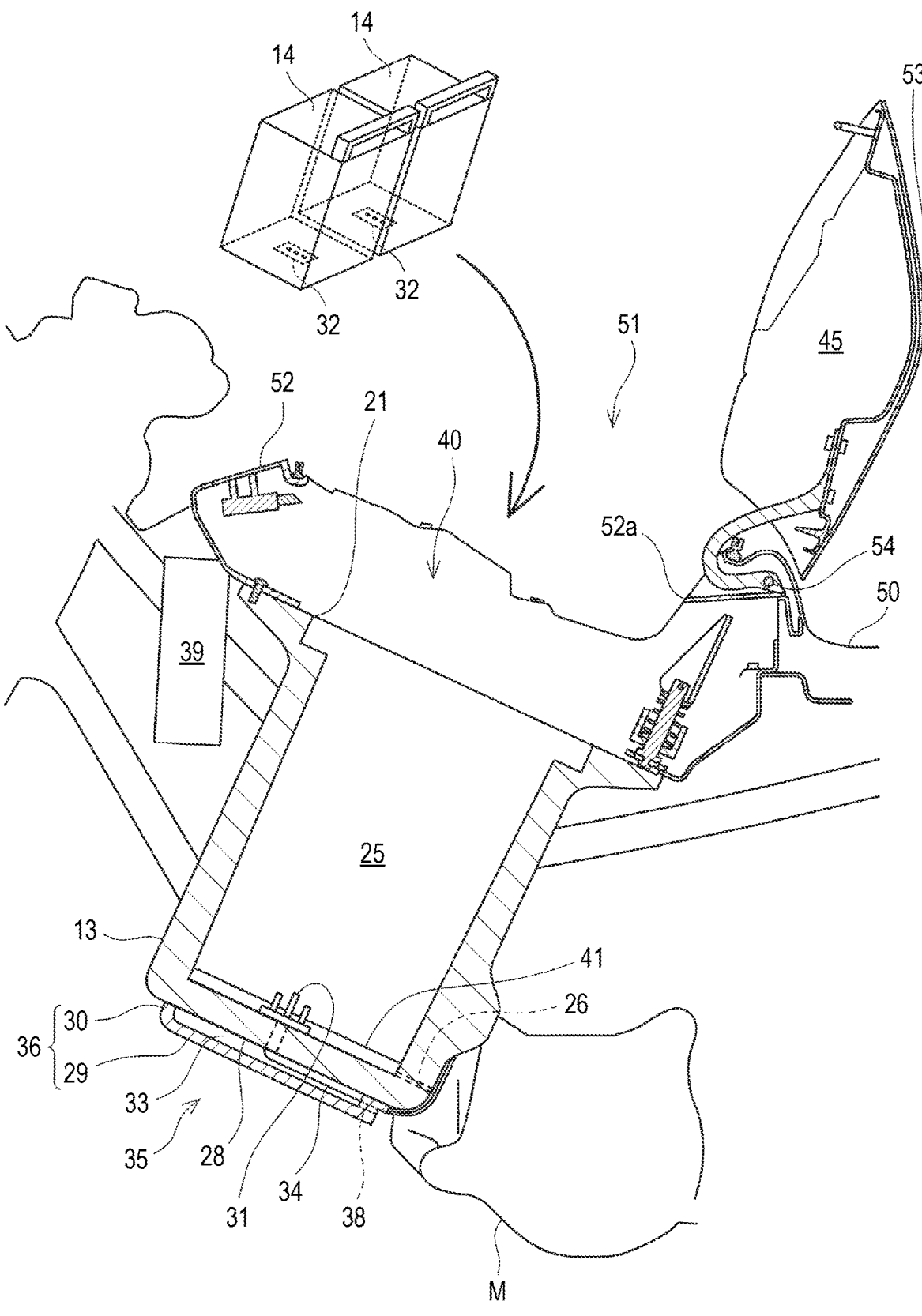
FIG. 6 is a cross-sectional view of the periphery of the battery case in the straddle-type vehicle of FIG. 1, taken along the surface in the front-rear direction in a state in which the cover is open and a lid is removed.
Figure 7:
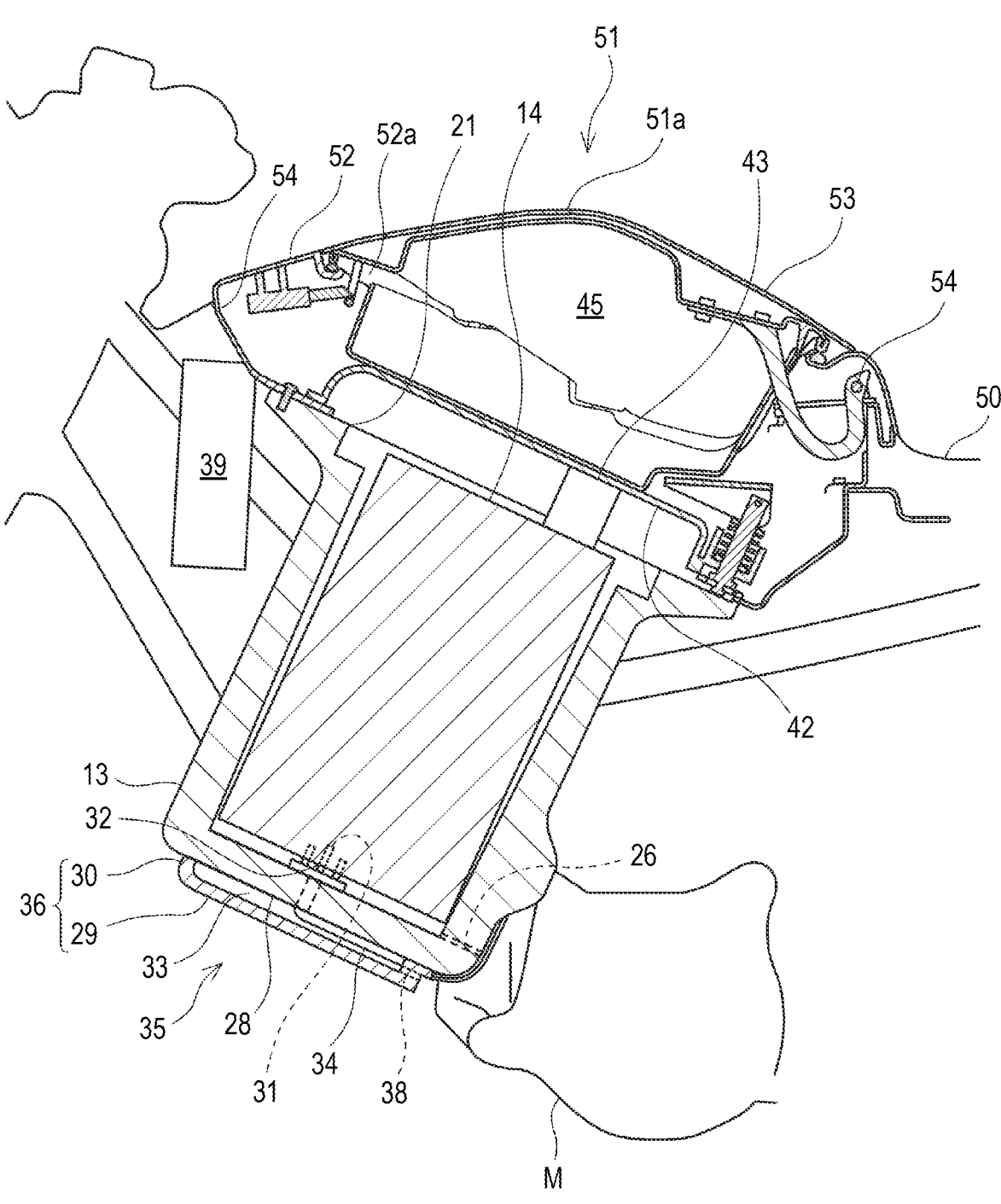
FIG. 7 is a cross-sectional view of the periphery of the battery case in the straddle-type vehicle of FIG. 1, taken along the surface in the front-rear direction in a state in which batteries are mounted on the battery case, the lid is attached, and the cover is closed.

Next, a configuration of the battery case 13 will be described. FIG. 3 is a cross-sectional view of the battery case 13 taken along a surface extending in the front-rear direction. FIG. 4 is a cross-sectional view of the battery case 13 taken along a surface extending in the width direction. FIGS. 5 and 6 are cross-sectional views of a region in the periphery of the battery case taken along a surface extending in the front-rear direction. FIG. 5 shows a state in which, in the straddle-type vehicle 1, the outer lid 53 covering an insertion opening 40 of the straddle-type vehicle 1 for accessing the battery case 13 is closed. FIG. 6 shows a state in which the outer lid 53 covering the insertion opening 40 of the straddle-type vehicle 1 is opened and a lid 42 is removed. FIG. 7 shows a cross-sectional view of the region in the periphery of the battery case in a state in which the batteries 14 are accommodated inside the battery case 13, taken along a surface extending in the front-rear direction.

As shown in FIG. 3, the battery case 13 is configured as a housing capable of accommodating the batteries 14. The battery case 13 has an accommodation space 25 for accommodating the batteries 14. The battery case 13 includes an inner bottom wall 28 inclined downward toward the rear, and side walls 48 extending upward from the inner bottom wall 28 and surrounding a lateral side of the accommodation space 25. The battery case 13 has openings 21 that open the accommodation space 25 of the batteries 14 upward in order to insert and remove the batteries 14. The battery case 13 is inclined with respect to a vertical direction such that the openings 21 face obliquely upward and rearward when the battery case 13 is attached to the straddle-type vehicle 1. That is, the battery case 13 is attached to the straddle-type vehicle 1 so as to be inclined rearward from a lower end to an upper side.

The accommodation space 25 of the battery case 13 is configured such that an area of a cross section orthogonal to an insertion direction D1 of the battery 14 decreases toward a lower side. In the present embodiment, steps 22 are provided on a front surface and a rear surface of an upper portion of an inner surface of the battery case 13. Further, below the portion of the inner surface of the battery case 13 where the steps 22 are provided, the battery case 13 is configured such that the front surface and the rear surface of the inner surface of the battery case 13 are formed in a tapered shape to approach each other toward the lower side. The battery case 13 is configured such that the inner surface thereof becomes narrow inward from the upper side to the lower side by a part where the steps 22 are provided on the upper portion thereof and a part 24 formed in the tapered shape on the lower portion thereof. The side wall 48 of the battery case 13 has a drain hole 26 for discharging water that has entered the accommodation space 25. The drain hole 26 opens at a lower and rear corner portion of the accommodation space 25 in the battery case 13. In a state in which the battery case 13 is attached to the straddle-type vehicle 1, the drain hole 26 extends toward the outside of the battery case 13 in a direction having at least a downward component. The drain hole 26 is provided in a rear end portion 13d of the battery case 13 at a position close to the inner bottom wall 28 of the side wall 48 in the upper-lower direction. In the accommodation space of the battery case 13, the drain hole 26 is configured to communicate the accommodation space 25 with the outside.

As shown in FIG. 4, the battery case 13 is configured to accommodate the two batteries 14 in the width direction. In the present embodiment, a partition portion 41 protruding from the inner bottom wall 28 of the battery case 13 toward the inside of the accommodation space 25 is provided so as to divide the accommodation space of the two batteries 14 disposed side by side in the width direction. The space in which the two batteries 14 are disposed is divided by the partition portion 41, and the batteries 14 can be disposed at appropriate positions.

The straddle-type vehicle 1 includes the lid 42 disposed above the battery case 13. As shown in FIG. 5, the lid 42 that closes the openings 21 is attached to the battery case 13. The lid 42 covers an upper side of the batteries 14 after the batteries 14 are accommodated in the battery case 13 to protect the batteries 14. In the present embodiment, the lid 42 is fixed to the battery case 13 by screwing.

The straddle-type vehicle 1 includes an outer lid member 51 provided in front of the seat 12 and above the lid 42. As shown in FIG. 5, the outer lid member 51 constitutes a part of an outer surface of the straddle-type vehicle 1 above the lid 42, and is configured to open and close the outer lid 53 above the battery case 13. The batteries 14 are protected by the battery case 13, the lid 42, and the outer lid member 51 when the batteries 14 are accommodated inside the battery case 13 mounted on the straddle-type vehicle 1. In the present embodiment, the outer lid member 51 is attached to an upper end 48a of the side wall 48 of the battery case 13. In the present embodiment, the outer lid member 51 is partially embedded in a cowl 50 of the straddle-type vehicle 1 at a position in front of the seat 12, and a portion protruding from the cowl 50 constitutes an outer surface of the straddle-type vehicle 1.

The outer lid member 51 is located between legs of the rider when the rider straddles over the seat 12, and an upper end 51a of the outer lid member 51 protrudes upward from the seat 12. The outer lid member 51 includes a base 52 having an opening 52a, the outer lid 53 provided so as to be able to open and close the opening 52a of the base 52, and a hinge portion 54 rotatably connecting the outer lid 53 to the base 52. When the outer lid 53 is rotated about the hinge portion 54, the outer lid 53 opens and closes with respect to the base 52. The hinge portion 54 is provided at a rear portion of the base 52 such that the outer lid 53 opens rearward. When the outer lid 53 is closed, the hinge portion 54 is disposed at a position lower than a front end of the outer lid 53.

When the outer lid 53 is opened, as shown in FIG. 6, the insertion opening 40 is provided inside the base 52 as a space through which the batteries 14 pass when the batteries 14 are inserted into and removed from the battery case 13. The insertion opening 40 is located above the battery case 13 along the insertion direction in which the batteries are inserted toward the battery case 13. As shown in FIG. 6, the insertion opening 40 is provided in the outer lid member 51.

As shown in FIGS. 5, 6, and 7, in the present embodiment, the battery case 13 is adjacent to a front side of the motor M and is attached to the straddle-type vehicle 1. The battery case 13 is disposed between the front fork 5 and the motor M in the front-rear direction of the straddle-type vehicle 1. In the present embodiment, as will be described later, the battery case 13 is disposed in an inclined manner, and the front surface of the battery case 13 extends in the same direction as the longitudinal direction of the front fork 5.

As shown in FIG. 7, the lid 42 is configured to abut on an upper end 43 of the batteries 14 in a state in which the batteries 14 are accommodated inside the battery case 13. Since the batteries 14 are in contact with the lid 42 in a state of being accommodated in the battery case 13, the batteries 14 are pressed inside the battery case 13. Since the batteries 14 are pressed by the lid 42 even during traveling of the straddle-type vehicle 1, even if a force acts on the straddle-type vehicle 1 in the upper-lower direction during traveling, the batteries 14 can be prevented from moving in the upper-lower direction.

As shown in FIGS. 3 to 7, a bottom portion of the battery case 13 has a double-bottom structure 35. The double-bottom structure 35 on the bottom portion of the battery case 13 includes an inner bottom wall 28, an outer bottom wall 29 covering the inner bottom wall 28 from below, and a peripheral wall 30 connecting the outer bottom wall 29 to the inner bottom wall 28. The inner bottom wall 28 and the outer bottom wall 29 are collectively referred to as a bottom wall 56. As the battery case 13 is inclined, the bottom wall 56 is inclined downward as going rearward. The inner bottom wall 28 of the battery case 13 is provided with the case-side connector 31 protruding toward an inside of the accommodation space 25. The battery 14 is provided with a battery-side connector 32 connected to the case-side connector 31 when the battery 14 is accommodated in the accommodation space of the battery case 13.

In a wiring space 33 between the outer bottom wall 29 and the inner bottom wall 28 in the double-bottom structure 35 of the battery case 13, an electric wire 34 connected to the case-side connector 31 is disposed. In the present embodiment, the electric wire 34 extends from the case-side connector 31 toward the wiring space 33 through an inside of the inner bottom wall 28 of the battery case 13, and extends rearward through the inside of the wiring space 33 to an outside of the battery case 13. The battery case 13 includes the double-bottom structure 35, the case-side connector 31, and the electric wire 34. In the present embodiment, the outer bottom wall 29 and the peripheral wall 30 are formed separately from the inner bottom wall 28. The outer bottom wall 29 and the peripheral wall 30 constitute a one-piece bottom lid 36.

Figure 8:
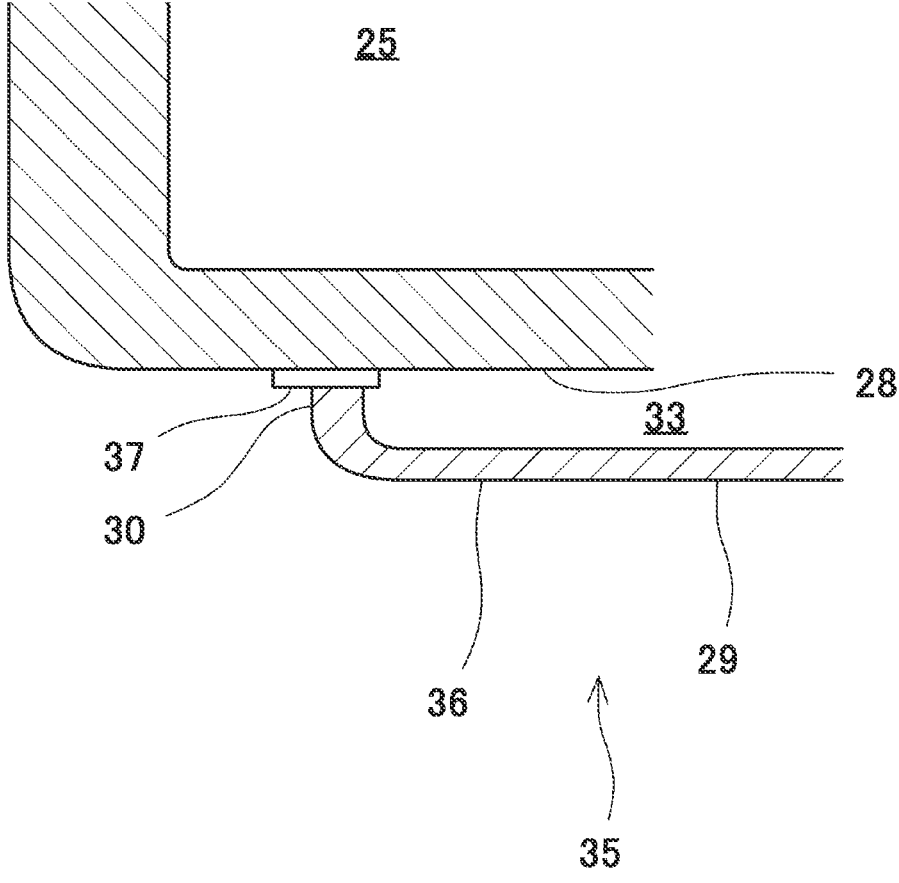
FIG. 8 is an enlarged cross-sectional view of a double-bottom structure provided in a front portion of the battery case in the straddle-type vehicle of FIG. 1, taken along the surface in the front-rear direction.

FIG. 8 shows an enlarged cross-sectional view of the double-bottom structure 35 provided in a front portion of the battery case 13. A seal member 37 is interposed between mating surfaces of the inner bottom wall 28 and the bottom lid 36 of the battery case 13. As shown in FIGS. 5 to 7, a drain hole 38 is provided in the peripheral wall 30. The drain hole 38 is provided in the rear end portion 13d of the battery case 13 at a position close to the outer bottom wall 29. The drain hole 38 is configured to communicate the wiring space 33 with the outside.

In the present embodiment, since the outer bottom wall 29 is inclined to extend downward as going rearward, even if water enters the wiring space 33 of the battery case 13, the water that has entered the wiring space 33 flows along the outer bottom wall 29. The water that has entered the wiring space 33 is directed rearward in the wiring space 33. In the present embodiment, since the drain hole 38 is provided in the inner surface of the battery case 13 at a position rearward and close to the outer bottom wall 29, the water that has entered proceeds toward the drain hole 38, and as a result, the water is discharged from the drain hole 38. In the present embodiment, the drain holes 26, 38 are provided in the accommodation space 25 and the wiring space 33 so as to drain the water that has entered the spaces.

The straddle-type vehicle 1 further includes electrical component disposed in front of the battery case 13 such that at least part of the electrical component overlaps the battery case 13 in the upper-lower direction. FIGS. 5, 6, and 7 show an electrical component arrangement space 39 in which the electrical component is disposed in front of the battery case 13. The electrical component used in the straddle-type vehicle 1 is disposed in the electrical component arrangement space 39.

In the present embodiment, as described above, the battery case 13 is attached to the vehicle body frame 4 so as to be inclined rearward from the lower end to the upper side. Accordingly, the space in which objects can be disposed is formed in front of the battery case 13. Accordingly, in the present embodiment, it is not necessary to newly provide a space in which the electrical component is disposed, by disposing the electrical component in the space formed in front of the battery case 13. Therefore, the space inside the straddle-type vehicle 1 can be efficiently utilized. Accordingly, the straddle-type vehicle 1 can be downsized. In particular, in the present embodiment, the ECU is included in the electrical component provided in the electrical component arrangement space 39 formed in front of the battery case 13. By providing the electrical component including the ECU in the electrical component arrangement space 39 in front of the battery case 13, the ECU can be provided in the space that directly receives traveling wind. Accordingly, the ECU can be efficiently cooled by the traveling wind. In particular, since the ECU easily generates heat as the straddle-type vehicle 1 travels, the temperature of the ECU can be set to an appropriate temperature even during traveling of the straddle-type vehicle 1 by cooling the ECU with traveling wind.

When the batteries 14 are accommodated in the battery case 13, as shown in FIG. 6, the outer lid 53 covering the insertion opening 40 is opened. When the outer lid 53 is opened, the lid 42 above the battery case 13 is removed. When the outer lid 53 is opened and the lid 42 is removed, the inside of the accommodation space 25 of the battery case 13 can be accessed from the outside. The battery 14 passes through the insertion opening 40 on the inner side in the front-rear direction of the base 52, passes through the openings 21 of the battery case 13, and is disposed in the accommodation space 25 of the battery case 13. Then, the lid 42 is attached above the battery case 13 in a state in which the batteries 14 are accommodated in the accommodation space 25 of the battery case 13, and the insertion opening 40 is closed by the outer lid 53, whereby accommodation of the batteries 14 in the battery case 13 is completed.

Figure 9:
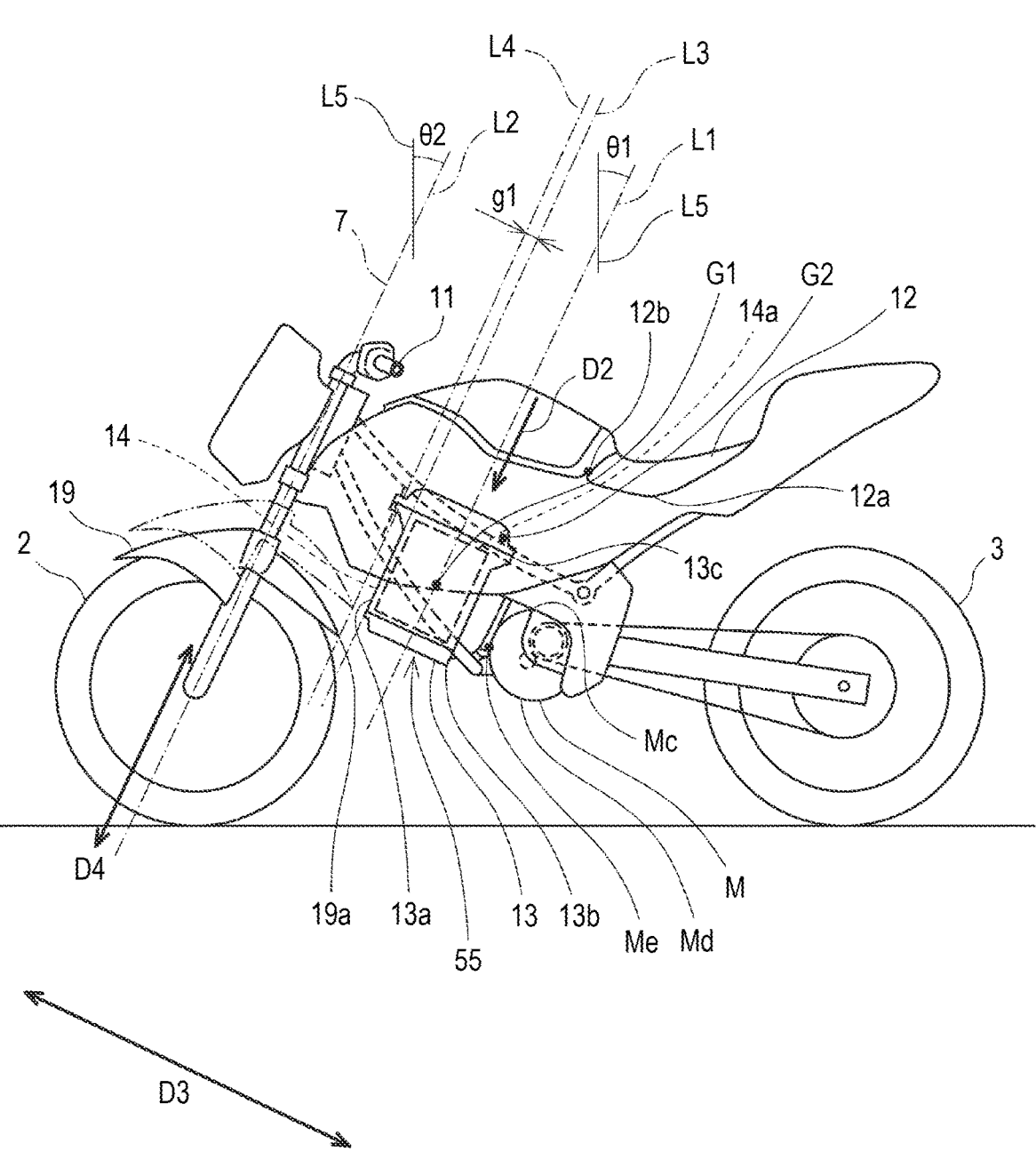
FIG. 9 is an illustrative view for illustrating an inclination angle of the battery case in the straddle-type vehicle of FIG. 1.

The inclination of the battery case 13 will be described with reference to FIG. 9. The battery case 13 is inclined with respect to the vertical direction such that the openings 21 of the battery case 13 face obliquely upward and rearward, a line L1 connecting a center of the opening 21 at an upper end of the battery case 13 to a center of the inner bottom wall 28 is inclined. When the battery 14 is inserted into the battery case 13, the battery 14 is inserted into the battery case 13 along the center line L1. A direction in which the battery 14 is inserted into the battery case 13 along the line L1 at this time is referred to as an insertion direction D2 of the battery 14 into the battery case 13, and an angle at which the line L1 is inclined with respect to a line L5 extending in the vertical direction at this time is referred to as an insertion angle θ1. Since the battery case 13 is disposed in the straddle-type vehicle 1 in a way of being inclined at the insertion angle θ1, a front surface 13a of an outer wall of the battery case 13 is inclined with respect to the vertical direction. Further, a line along a longitudinal direction D4 of the front fork 5 is referred to as a line L2, and an angle at which the line L2 is inclined with respect to the line L5 extending in the vertical direction is referred to as an inclination angle θ2. In the present embodiment, the straddle-type vehicle 1 is configured such that the insertion angle θ1 of the battery 14 in the battery case 13 and the inclination angle θ2 of the longitudinal direction D4 of the front fork 5 with respect to the vertical direction are the same angle. Accordingly, the straddle-type vehicle 1 is configured such that the insertion direction D2 of the battery 14 into the openings 21 of the battery case 13 is the same as the longitudinal direction D4 of the front fork 5 when the battery 14 is accommodated in the battery case 13.

Since the insertion angle θ1 of the battery 14 in the battery case 13 and the inclination angle θ2 of the longitudinal direction D4 of the front fork 5 are inclined at the same angle, even if the front fork 5 extends and contracts and the front fender 19 moves accordingly, the front fender 19 moves while maintaining a length g1 of a gap between a rear end 19a of the front fender 19 and the front surface 13a of the battery case 13 in an orthogonal direction D3 orthogonal to the insertion direction D2. Accordingly, in the orthogonal direction D3, the front fender 19 is prevented from moving toward the front surface 13a of the battery case 13. In FIG. 9, a line along a direction in which the front surface 13a of the battery case 13 extends is referred to as a line L3, and a line along an extending direction of a movement trajectory of the front end 19a of the front fender 19 linked with the extension and contraction of the front fork 5 is referred to as a line L4.

When the front fender 19 moves, since the length g1 of the gap between the rear end 19a of the front fender 19 and the front surface 13a of the battery case 13 is maintained in the orthogonal direction D3, interference between the front fender 19 and the battery case 13 can be suppressed regardless of an amount of movement of the front fender 19. Since the battery case 13 and the front fork 5 are inclined at the same angle and the front surface 13a of the battery case 13 is located rearward of the front fork 5, the front surface 13a of the battery case 13 is located rearward of the movement trajectory of the front end 19a of the front fender 19 linked with the extension and contraction of the front fork 5. Therefore, the arrangement position of the battery case 13 is prevented from being limited by the interference with the front fender 19, and a degree of freedom of design of the straddle-type vehicle 1 is improved.

In particular, even if the battery case 13 is disposed at a low position in the straddle-type vehicle 1, the interference between the front fender 19 and the battery case 13 is suppressed, and thus the arrangement position of the battery case 13 can be lowered. In general, the battery 14 accommodated in the battery case 13 of the straddle-type vehicle 1 is a heavy object. Since the battery 14 which is the heavy object can be disposed at the low position, a center of gravity of the straddle-type vehicle 1 can be lowered.

Since the battery case 13 can be disposed at the low position, in the present embodiment, the battery case 13 is disposed such that a lower end 13b of the battery case 13 is located lower than an upper end Mc of the motor M. The lower end 13b of the battery case 13 is disposed between the front fork 5 and the motor M in the front-rear direction of the straddle-type vehicle 1. In the present embodiment, since the upper portion of the battery case 13 is located rearward of the lower portion of the battery case 13, the upper portion of the battery case 13 can be disposed close to the motor M. Specifically, the rear end portion of the upper portion of the battery case is located rearward of a front end portion of the motor. That is, in a top view, a portion of the battery case and a portion of the motor overlap each other in the upper-lower direction. As a result, a center of gravity G1 of the battery 14 can be disposed closer to a center of gravity G2 (in other words, a roll axis) of the vehicle body of the straddle-type vehicle 1 compared with a case where the battery case is disposed vertically. When the rider turns and travels using the straddle-type vehicle 1, the rider causes the vehicle body to undergo angular displacement about the roll axis by weight shift. In this case, since the center of gravity G1 of the battery is close to the center of gravity G2 of the vehicle body, a rotational moment required for turning the vehicle body about the roll axis can be reduced. Accordingly, operability can be improved when an attitude of the vehicle is changed. Further, when the center of gravity G1 of the battery approaches not only the roll axis but also the center of gravity G2 of the vehicle body, inertia when the vehicle body changes its posture around the center of gravity G2 of the vehicle body (around a pitch, a yaw, the roll axis) can be reduced. In this way, it is possible to accelerate the attitude change of the vehicle based on a force applied from the rider or the vehicle, and thus it is possible to improve motion performance of the straddle-type vehicle 1. In this way, since the center of gravity of the straddle-type vehicle 1 is lowered, and the battery 14 can be disposed in a way that the center of gravity G1 of the battery 14 is brought close to the center of gravity G2 of the straddle-type vehicle 1, the operability of the straddle-type vehicle 1 can be improved, and the driving feeling of the straddle-type vehicle 1 can be improved.

In the present embodiment, the battery case 13 is disposed on the straddle-type vehicle 1 such that the lower end 13*b* of the battery case 13 is located above a lower end Md of the motor case Ma of the motor M. Since the lower end 13*b* of the battery case 13 is located above the lower end Md of the motor case Ma, the motor case Ma is likely to come into contact with an obstacle below the vehicle body before the battery case 13. Accordingly, the battery case 13 can be prevented from coming into contact with the obstacle, and the battery 14 inside the battery case 13 can be more reliably protected.

In the present embodiment, since the battery case 13 is disposed at the low position in the straddle-type vehicle 1, the upper end position 14*a* of the battery accommodated in the battery case 13 is located below a lower end 12*a* of the seat 12. In the present embodiment, an upper rear end 13*c* of the battery case 13 is disposed behind the front end Me of the motor case Ma of the drive motor M. In the present embodiment, the upper rear end 13*c* of the battery case 13 is disposed forward of the seat front end 12*b*.

In the present embodiment, the front fender 19 moves in response to the front fork 5 extending and contracting. In the present embodiment, the straddle-type vehicle 1 prevents the interference between the battery case 13 and the front fender 19 by the inclination of the battery case 13. In the present embodiment, the component (linkage component) that moves up and down in accordance with the extension and contraction of the front fork 5 may be a component other than the front fender 19. For example, an aerodynamic part that is a part for obtaining down force may be the linkage component. In this case, the present invention can be suitably applied to a case where the aerodynamic part is attached to a portion that moves up and down in accordance with the extension and contraction of the front fork 5, and a rear end of the aerodynamic part is located close to the battery case 13.

According to the present embodiment, the insertion direction D2 of the battery 14 into the battery case 13 when the battery 14 is accommodated in the battery case 13 is the same as the longitudinal direction D4 of the front fork 5. Accordingly, when the battery 14 is inserted and removed from the battery case 13, it is possible to prevent the components provided on an upper portion of the front fork 5 from interfering with the operation of inserting and removing the battery 14. In the present embodiment, the steering shaft 7 is provided above the front fork 5, and the handle bar 11 is attached to the steering shaft 7. Generally, the steering shaft 7 extends along the extension direction D4 of the front fork 5, and the extension direction D4 of the front fork 5 and an extension direction of the steering shaft 7 are the same. When the insertion direction D2 of the battery 14 is the same as the extension direction D4 of the front fork 5, the insertion direction D2 of the battery 14 is substantially the same as the extension direction of the steering shaft 7. Accordingly, when the battery 14 is accommodated in the battery case 13, the interference between the battery 14 and the steering shaft 7 can be suppressed. Accordingly, the steering shaft 7 can be prevented from interfering with the operation of accommodating the battery 14.

According to the present embodiment, the battery case 13 is configured such that the inner surface thereof faces inward as going toward the lower side. Therefore, the openings 21 of the battery case 13 are formed to become large, and the battery 14 can be easily accommodated when the battery 14 is accommodated in the battery case 13. Further, in the present embodiment, since the steps 22 are provided on the upper portions of the front surface and the rear surface of the accommodation space 25 inside the battery case 13, the insertion position of the battery 14 can be located within a certain range when the battery 14 is inserted into the accommodation space 25 of the battery case 13. Further, in the present embodiment, the front surface and the rear surface of the lower portion of the steps 22 in the accommodation space 25 inside the battery case 13 are formed in the tapered shape so as to approach each other toward the lower side. Accordingly, the inner surface of the battery case 13 functions as a guide surface when the battery 14 is inserted. Therefore, by inserting the battery 14 along the inner surface of the battery case 13, the battery 14 can be disposed at an appropriate installation position in the battery case 13.

In the present embodiment, the inner bottom wall 28 of the battery case 13 is provided with the case-side connector 31 protruding toward the accommodation space 25. Further, the battery-side connector 32 is provided at the lower end of the battery 14 so as to protrude toward the inner bottom wall 28 of the battery case 13 when the battery 14 is accommodated in the battery case 13. When the battery 14 is installed at an appropriate position in the battery case 13, the case-side connector 31 and the battery-side connector 32 are appropriately connected. In the present embodiment, if the battery 14 is not installed at the appropriate position in the battery case 13, the case-side connector 31 and the battery-side connector 32 are not appropriately connected.

According to the present embodiment, when the battery 14 is inserted into the accommodation space of the battery case 13, the insertion position of the battery 14 is determined by the steps 22, and the battery 14 is guided by the tapered surfaces 24. Accordingly, in a process of inserting the battery 14, the battery 14 can be guided to the installation position of the battery case 13, and the battery 14 can be disposed at an appropriate installation position. Accordingly, it is possible to more reliably and appropriately connect the case-side connector 31 to the battery-side connector 32. Further, the operator who inserts the battery 14 can simplify the operation of positioning the battery 14 and the battery case 13.

According to the present embodiment, the outer bottom wall 29 and the peripheral wall 30 are formed as the one-piece bottom lid 36. The seal member 37 is interposed between the mating surfaces of the inner bottom wall 28 and the bottom lid 36 of the battery case 13. Accordingly, water is prevented from entering the wiring space 33 through between the inner bottom wall 28 and the bottom lid 36. Further, when the battery case 13 is disposed in the inclined manner, the drain hole 38 is provided at the rear position on the inner surface of the wiring space 33. Even if water temporarily enters the wiring space 33, the water that has entered is discharged from the drain hole 38. Accordingly, the inside of the wiring space 33 is protected with high waterproof properties.

According to the present embodiment, even if water temporarily enters the accommodation space 25, the water that has entered is discharged from the drain hole 26. Accordingly, the inside of the accommodation space 25 is protected with high waterproof properties.

According to the present embodiment, since the bottom portion of the battery case 13 is configured to have the double-bottom structure 35, strength of the bottom portion 55 of the battery case 13 can be improved. In the present embodiment, since the battery case 13 is disposed in the inclined manner, the bottom portion 55 of the battery case 13 is disposed in a posture of relatively facing a front of the straddle-type vehicle 1. Therefore, the bottom portion 55 of the battery case 13 is disposed at a position where the bottom portion 55 is likely to receive wind pressure caused by the traveling wind. In the present embodiment, since the strength of the bottom portion 55 of the battery case 13 is improved by the double-bottom structure 35, even if the bottom portion 55 receives a strong wind pressure, durability of the battery case 13 is ensured. Further, even if a load acts on the battery case 13 due to the extension and contraction of the front fork 5, since the insertion direction D2 of the battery 14 in the battery case 13 and the extension direction of the front fork are the same direction, the bottom portion can receive the load acting on the battery case 13 by the surface. Accordingly, the load acting on the bottom portion of the battery case 13 per unit area can be reduced, and the durability of the battery case 13 can be improved.

The straddle-type vehicle 1 includes a storage 45 disposed above the battery case 13 and capable of accommodating objects. In the present embodiment, as described above, the battery case 13 is attached to the vehicle body frame 4 in the inclined manner, whereby the battery case 13 can be disposed at the low position of the straddle-type vehicle 1. Since the battery case 13 is disposed at the relatively low position inside the straddle-type vehicle 1, a space is formed above the battery case 13 in the straddle-type vehicle 1. Accordingly, the space can be used as the storage 45 capable of accommodating objects. In the present embodiment, the storage 45 is provided inside the outer lid 53 of the outer lid member 51. Accordingly, the storage 45 serving as an accommodation space can be provided in the straddle-type vehicle 1 without increasing a height of the straddle-type vehicle 1. Accordingly, the straddle-type vehicle 1 can be easily used while suppressing an increase in size of the straddle-type vehicle 1. In the present embodiment, the space of the storage 45 can be accessed by opening the outer lid 53, and the objects can be taken out from the storage 45 when the objects are accommodated in the storage 45. When the objects are stored in the storage 45, the objects are stored inside the storage 45 in a state where the lid 42 is attached to the battery case 13.

In the present embodiment, an aspect in which the front surface 13a of the battery case 13 extends in the same direction as the front fork 5 extends is described, but the present invention is not limited thereto. The front surface 13a of the battery case 13 may extend in a direction away from the front fork 5 to the rear, as going upward. Accordingly, even if the front fender 19 moves up and down together with the front fork 5, the interference between the battery case 13 and the front fender 19 can be suppressed.

Further, in the above-described embodiment, an aspect in which the straddle-type vehicle 1 is a motorcycle has been described, but the present invention is not limited thereto. The straddle-type vehicle 1 may include one wheel or three or more wheels. The straddle-type vehicle 1 may include at least one wheel.

In the above-described embodiment, the angle $\theta 1$ at which the insertion direction D2 of the battery 14 into the battery case 13 is inclined with respect to the vertical direction and the angle $\theta 2$ at which the extension direction of the front fork 5 is inclined with respect to the vertical direction are the same, but the present invention is not limited thereto. The angle $\theta 1$ at which the insertion direction D2 of the battery 14 into the battery case 13 is inclined with respect to the vertical direction may be larger than the angle $\theta 2$ at which the front fork 5 is inclined. Accordingly, the battery case 13 is disposed such that the front surface 13a of the battery case 13 extends in the direction away from the front fork 5 to the rear as going upward, and the battery case 13 is away from the front fork 5 toward the upper side. Thus, even if the front fender 19 is linked with the extension and contraction of the front fork 5, the interference between the battery case 13 and the front fender 19 can be suppressed.

Further, in the above-described embodiment, an aspect in which the steps 22 are provided on the upper portion of the front surface and the rear surface of the inner surface of the battery case 13, and the front surface and the rear surface of the lower portion of the steps 22 of the inner surface of the battery case 13 are formed in the tapered shape so as to approach each other toward the lower side is described, but the present invention is not limited thereto. In addition to the front surface and the rear surface of the inner surface of the battery case 13, the steps 22 may be provided on both side surfaces of the inner surface of the battery case 13. In addition to the front surface and the rear surface of the lower portion of the steps 22 on the inner surface of the battery case, both the side surfaces of the lower portion of the steps 22 on the inner surface of the battery case may be formed in the tapered shape so as to approach each other toward the lower side. Further, the steps 22 may not be provided on the front surface and the rear surface of the inner surface of the battery case 13, and the steps 22 may be provided only on both the side surfaces of the inner surface of the battery case 13. Further, the front surface and the rear surface of the inner surface of the battery case 13 may not be formed in the tapered shape, and only both the side surfaces of the inner surface of the battery case 13 may be formed in the tapered shape. The battery case 13 may have either a configuration in which the steps are provided on the upper portion of the inner surface of the battery case 13 or a configuration in which the inner surface of the battery case 13 is formed in the tapered shape. Further, the battery case 13 may be configured such that the steps are provided on the upper portions of the front surface and the rear surface or both the side surfaces of the inner surface of the battery case 13, and the other of the front surface and the rear surface or both the side surfaces of the inner surface of the battery case is formed in the tapered shape. That is, in the inner surface of the battery case 13, the surfaces on which the steps 22 are provided may be different from the surfaces 24 formed in the tapered shape.

In the above-described embodiment, the drain hole 26 is formed in the rear end portion 13*d* of the battery case 13 so as to penetrate the side wall 48 in the direction orthogonal to the insertion direction D1 of the battery 14, but the present invention is not limited thereto. The drain hole 26 may have another configuration as long as the water that has entered the accommodation space 25 can be drained to the outside. For example, the drain hole 26 may be formed to penetrate the inner bottom wall 28 along the insertion direction D1 of the battery 14, and may be configured to drain the water that has entered the accommodation space 25 to the outside. In this case, the drain hole 26 is required to be formed at a position outside the bottom lid 36 so as not to interfere with the bottom lid 36.

In the above-described embodiment, the drain hole 38 is formed in the rear end portion 13*d* of the battery case 13 so as to penetrate the peripheral wall 30 in the direction orthogonal to the insertion direction D1 of the battery 14, but the present invention is not limited thereto. The drain hole 38 may have another configuration as long as the water that has entered the wiring space 33 can be drained to the outside. For example, the drain hole 38 may be formed to penetrate the outer bottom wall 29 along the insertion direction D1 of the battery 14, and may be configured to drain the water that has entered the wiring space 33 to the outside.

Further, in the above-described embodiment, an aspect in which the straddle-type vehicle 1 includes the motor M as the drive source that generates the power to be transmitted to the wheels is described, but the present invention is not limited thereto. The straddle-type vehicle 1 may include a drive source other than the motor. For example, the straddle-type vehicle 1 may include an engine as the drive source. Further, the drive source may not be a single one, and the straddle-type vehicle 1 may be driven by using drive forces generated by a plurality of drive sources. In the case where the straddle-type vehicle 1 does not include the motor M as the drive source, the electric power stored in the battery 14 may be supplied to the electrical component other than the drive source and used therein.

As described above, the embodiment has been described as an example of the technique disclosed in the present application. However, the technology disclosed in the present disclosure is not limited thereto, and is also applicable to embodiments in which changes, replacements, additions, omissions, and the like are appropriately performed. In addition, it is also possible to combine constituent elements described in the above-described embodiments to provide a new embodiment. For example, a part of a configuration or a method in one embodiment may be applied to another embodiment, and a part of a configuration in the embodiment may be freely extracted from another configuration in the embodiment. Further, the constituent elements described in the accompanying drawings and the detailed description include not only constituent elements essential for solving the problem but also constituent elements that are not essential for solving the problem in order to illustrate the technique.

Each of the following aspects is a disclosure of a preferred embodiment.

<First Aspect>

A straddle-type vehicle includes: a vehicle body frame; at least one wheel; a drive source configured to generate power to be transmitted to the wheel; and a battery case including an accommodation space in which a battery for storing electric power is accommodated and an opening that opens the accommodation space upward for inserting and removing the battery. The battery case is inclined with respect to a vertical direction such that the opening faces obliquely upward and rearward. A lower end of the battery case is disposed in a front space of the drive source and located lower than an upper end of the drive source.

<Second Aspect>

According to the first aspect of the present disclosure, the at least one wheel may include a front wheel and a rear wheel. The straddle-type vehicle may further include: a front fork connecting the vehicle body frame to the front wheel and extending obliquely upward and rearward, and configured to extend and contract in a longitudinal direction to reduce an impact transmitted to the vehicle body frame. The lower end of the battery case may be disposed between the front fork and the drive source in a front-rear direction of the straddle-type vehicle. A front surface of the battery case may extend away from the front fork toward the same direction as the longitudinal direction of the front fork or toward an upper side of the front fork.

<Third Aspect>

According to the first or the second aspect of the present disclosure, the at least one wheel may include a front wheel and a rear wheel. The straddle-type vehicle may further include: a front fork connecting the vehicle body frame to the front wheel and extending obliquely upward and rearward, and configured to extend and contract in a longitudinal direction to reduce an impact transmitted to the vehicle body frame; and a linkage component connected to the front fork and moving up and down together with the front fork in response to extension and contraction of the front fork. A front surface of the battery case may be located rearward of a movement trajectory of the linkage component linked with the extension and contraction of the front fork.

<Fourth Aspect>

According to the first to the third aspects of the present disclosure, the at least one wheel may include a front wheel and a rear wheel. The straddle-type vehicle may further include: a front fork connecting the vehicle body frame to the front wheel and extending obliquely upward and rearward, and configured to extend and contract in a longitudinal direction to reduce an impact transmitted to the vehicle body frame. The lower end of the battery case may be disposed between the front fork and the drive source in a front-rear direction of the straddle-type vehicle. An insertion direction of the battery may be a direction spaced away from the front fork toward the same direction as the longitudinal direction of the front fork or toward an upper side of the front fork.

<Fifth Aspect>

According to the first to the fourth aspects of the present disclosure, the accommodation space of the battery case may be configured such that an area of a cross section of the battery case orthogonal to an insertion direction of the battery decreases toward a lower side of the battery case.

<Sixth Aspect>

According to the first to the fifth aspects of the present disclosure, the battery case may include a bottom wall that supports the battery. The bottom wall of the battery case may be inclined downward and rearward. The battery case may have a drain hole opening at a corner portion arranged at a lower side and a rear side of the accommodation space.

\<Seventh Aspect\>

According to the first to the sixth aspects of the present disclosure, the straddle-type vehicle may further include an arrangement space may be a space for housing an electrical component. The arrangement space may be disposed in front of the battery case such that at least part of the electrical component overlaps the battery case in an upper-lower direction.

\<Eighth Aspect\>

According to the first to the seventh aspects of the present disclosure, an inner bottom wall of the battery case may be provided with a case-side connector that is connectable to a battery-side connector provided on the battery.

What is claimed is:

1. A straddle-type vehicle comprising:
a seat configured for sitting a rider;
a vehicle body frame;
at least one wheel;
a drive source configured to generate power to be transmitted to the wheel;
a battery case including an accommodation space in which a battery for storing electric power is accommodated and an opening that opens the accommodation space upward for inserting and removing the battery; and
a lid that covers the opening above the battery, wherein,
the battery case is inclined with respect to a vertical direction such that the opening faces obliquely upward and rearward,
a lower end of the battery case is disposed in a front space of the drive source and located lower than an upper end of the drive source, and
the seat is provided behind the lid.

2. The straddle-type vehicle according to claim 1,
wherein the at least one wheel includes a front wheel and a rear wheel,
wherein the straddle-type vehicle further comprises:
a front fork connecting the vehicle body frame to the front wheel and extending obliquely upward and rearward, and configured to extend and contract in a longitudinal direction to reduce an impact transmitted to the vehicle body frame,
wherein the lower end of the battery case is disposed between the front fork and the drive source in a front-rear direction of the straddle-type vehicle, and
wherein a front surface of the battery case extends away from the front fork toward a same direction as the longitudinal direction of the front fork or toward an upper side of the front fork.

3. The straddle-type vehicle according to claim 1,
wherein the at least one wheel includes a front wheel and a rear wheel,
wherein the straddle-type vehicle further comprises:
a front fork connecting the vehicle body frame to the front wheel and extending obliquely upward and rearward, and configured to extend and contract in a longitudinal direction to reduce an impact transmitted to the vehicle body frame; and
a linkage component connected to the front fork and moving up and down together with the front fork in response to extension and contraction of the front fork, and wherein a front surface of the battery case is located rearward of a movement trajectory of the linkage component linked with the extension and contraction of the front fork.

4. The straddle-type vehicle according to claim 1,
wherein the at least one wheel includes a front wheel and a rear wheel,
wherein the straddle-type vehicle further comprises:
a front fork connecting the vehicle body frame to the front wheel and extending obliquely upward and rearward, and configured to extend and contract in a longitudinal direction to reduce an impact transmitted to the vehicle body frame,
wherein the lower end of the battery case is disposed between the front fork and the drive source in a front-rear direction of the straddle-type vehicle, and
wherein an insertion direction of the battery is a direction spaced away from the front fork toward a same direction as the longitudinal direction of the front fork or toward an upper side of the front fork.

5. The straddle-type vehicle according to claim 1,
wherein the accommodation space of the battery case is configured such that an area of a cross section of the battery case orthogonal to an insertion direction of the battery decreases toward a lower side of the battery case.

6. The straddle-type vehicle according to claim 1,
wherein the battery case includes a bottom wall that supports the battery,
wherein the bottom wall of the battery case is inclined downward and rearward, and
wherein the battery case has a drain hole opening at a corner portion arranged at a lower side and a rear side of the accommodation space.

7. The straddle-type vehicle according to claim 1, further comprising:
an arrangement space is a space for housing an electrical component,
wherein the arrangement space is disposed in front of the battery case such that at least part of the electrical component overlaps the battery case in an upper-lower direction.

8. The straddle-type vehicle according to claim 1,
wherein an inner bottom wall of the battery case is provided with a case-side connector that is connectable to a battery-side connector provided on the battery.

9. The straddle-type vehicle according to claim 1, further comprising:
a storage disposed above the battery case and capable of accommodating an object.

10. The straddle-type vehicle according to claim 1, wherein
an upper rear end of the battery case is disposed behind a front end of the drive source and disposed forward of a front end of a seat of the vehicle.

11. The straddle-type vehicle according to claim 1, wherein
an upper end position of the battery accommodated in the battery case is located below a lower end of the seat.

* * * * *